United States Patent [19]
Zalewski

[11] Patent Number: 5,147,104
[45] Date of Patent: Sep. 15, 1992

[54] AUTOMOTIVE VEHICLE SEAT FOR DISABLED PERSONS

[75] Inventor: Wojciech Zalewski, Belmont, Mass.

[73] Assignee: Enhancements Unlimited, Inc., Newton, Mass.

[21] Appl. No.: 745,944

[22] Filed: Aug. 16, 1991

Related U.S. Application Data

[63] Continuation-in-part of Ser. No. 490,086, Mar. 7, 1990, Pat. No. 5,040,832.

[51] Int. Cl.⁵ ............................................. B60N 1/10
[52] U.S. Cl. .......................... 296/65.1; 297/DIG. 10; 414/462
[58] Field of Search ............... 296/65.10; 414/462; 297/337, 338, 345, 346, DIG. 10

[56] References Cited

U.S. PATENT DOCUMENTS

| | | | |
|---|---|---|---|
| 2,242,247 | 5/1941 | Grant | 296/65.1 |
| 2,266,200 | 12/1941 | Hedley | 296/65.1 |
| 2,290,464 | 7/1942 | Buchheit | 296/65.1 |
| 4,155,587 | 5/1979 | Mitchell | 296/65.1 |
| 4,479,752 | 10/1984 | Todd | 414/462 |
| 4,600,239 | 7/1986 | Gerstein | 297/349 |
| 4,733,903 | 3/1988 | Bailey | 296/65.1 |
| 4,815,785 | 3/1989 | Goodall et al. | 296/65.1 |

Primary Examiner—Robert R. Song
Attorney, Agent, or Firm—Morse, Altman, Dacey & Benson

[57] ABSTRACT

A seat for a disabled driver or passenger at the door of an automotive vehicle, the door moving between closed and open positions at a doorway through which the seat is accessible. The seat comprises a seat cushion including a stationary cushion component remote from the doorway and a transport cushion component adjacent to the doorway, the transport cushion component being constrained for movement in a path between a retracted position and an extended position. The transport cushion component, when in extended position, is located downwardly and outwardly of its retracted position. The transport cushion component is controlled by an operational system that includes a manual actuator for maintaining movement between the retracted position and the extended position when under constant manual control. The actuator is accessible to constant manual control at a handle bar that moves with the transport cushion.

15 Claims, 3 Drawing Sheets

AUTOMOTIVE VEHICLE SEAT FOR DISABLED PERSONS

RELATED APPLICATIONS

The present application is a continuation-in-part of co-pending application Ser. No. 07/490,086, filed Mar. 7, 1990, now U.S. Pat. No. 5,040,832.

FIELD OF THE INVENTION

The present invention relates to automotive vehicle seats and, more particularly, to car and mini-van seats of the type for assisting a disabled driver or passenger in accommodating himself or herself to and extricating himself or herself from an automotive vehicle front seat.

BACKGROUND OF THE INVENTION

It is well known that many persons with anatomical problems resulting from arthritis, rheumatism, bodily injury, surgical trauma, back pain, sciatica, etc. experience difficulties when attempting to fit themselves into and extricate themselves from seating in an automobile or van. Spacial constraints including low headroom, projecting controls, steering wheel proximity, and door and window obstructions require bending and twisting contortions by the driver or passenger as he or she fits into or alights from the seat.

Confronted with such difficulties, a disabled person may be forced to limit or forego automotive travel. Prior constructions designed primarily to assist only paraplegics and other severely impaired drivers generally have been unwieldy and obtrusive in use, as well as unadapted for concommitant use by normal drivers and passengers. The present invention is a response to difficulties of the type confronting persons with limited or severe impairment.

SUMMARY OF THE INVENTION

The primary object of the present invention is to provide an automotive vehicle seat, primarily either a driver's or front passenger's seat, which accommodates all drivers normally, but which also optionally assists disabled drivers and passengers to fit themselves into and extricate themselves from a front seat of a car or van. For ease of explanation, a driver's bucket seat behind the steering wheel in a mini-van is illustrated in the drawings and described in the specification. It is to be understood, however, that a passenger's front seat also is contemplated and, in design, is essentially a mirror image of the driver's seat described in detail. The front seat of a mini-van, for example, often is higher than the front seat of a typical car and poses special difficulties for the persons with anatomical problems.

In normal mode, the seat of the present invention presents seat and back cushions of conventional appearance and comfort. A normal driver or passenger can sit down while facing outwardly through an open door and swing his or her legs and torso into a normal driving posture facing the windshield. From driving posture, a normal driver or passenger can swing his or her legs and torso around to permit reaching the ground through an open doorway.

In assist mode, the car seat cushion preferably divides into two parts, an outer movable transport or lift cushion that is adjacent to the vehicle door and an inner stationary cushion that is remote from the vehicle door. The transport cushion operates electromechanically under the control of a disabled driver or passenger between an extended position and a retracted position. It provides a seat that gently controls the anatomy of the disabled driver or passenger between inner and outer postures at the open door. When in retracted position, it permits the disabled driver or passenger to swing his or her legs and torso between forward and sideward orientations.

Preferably, the configuration of the seat cushion as a whole is contoured to present a seating configuration at the forward edge which tends to retain the torso of the driver in forward orientation. The side of the transport cushion at the doorway is rounded to enable the driver or passenger to glide into successive postures as it extends or retracts.

Other objects of the present invention will in part be obvious and will in part appear hereinafter.

BRIEF DESCRIPTION OF THE DRAWINGS

For a fuller understanding of the nature and objects of the present invention, reference is made to the accompanying drawings, wherein.

DETAILED DESCRIPTION OF THE PREFERRED EMBODIMENT

Figure 1:
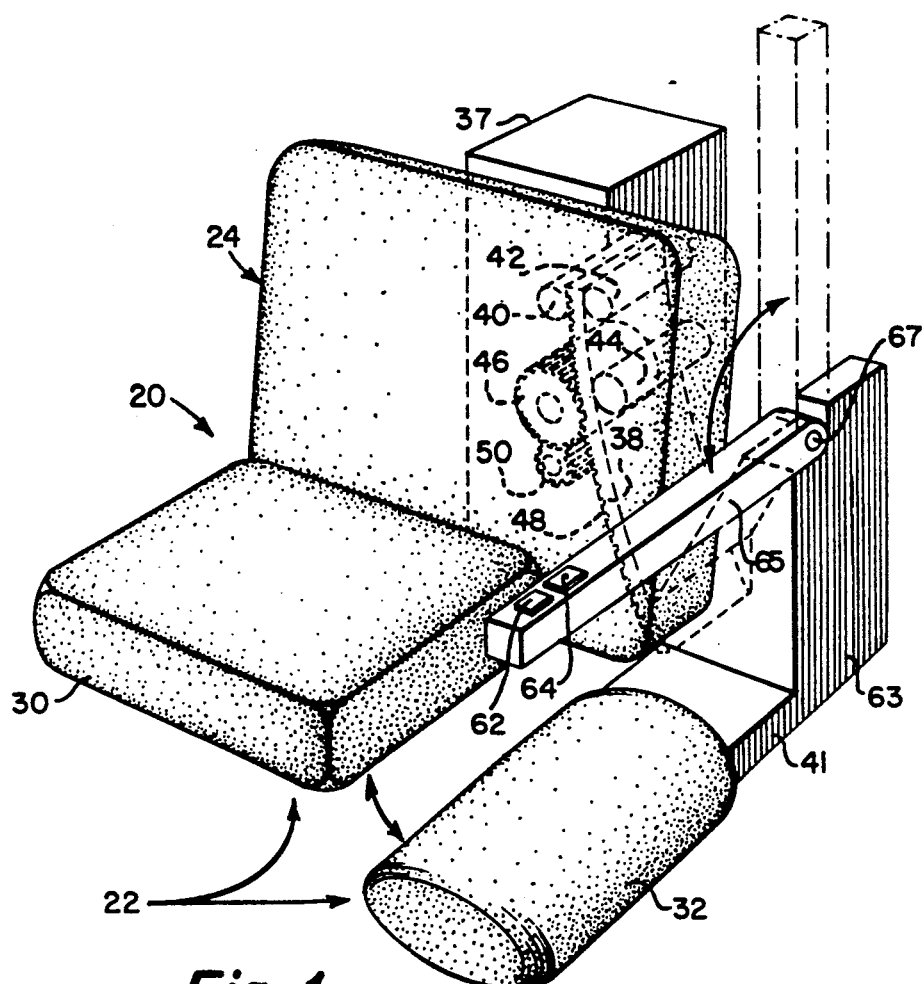
FIG. 1 is a perspective view, partly in phantom, to show the general structure of the car seat of the present invention.
Figure 3:
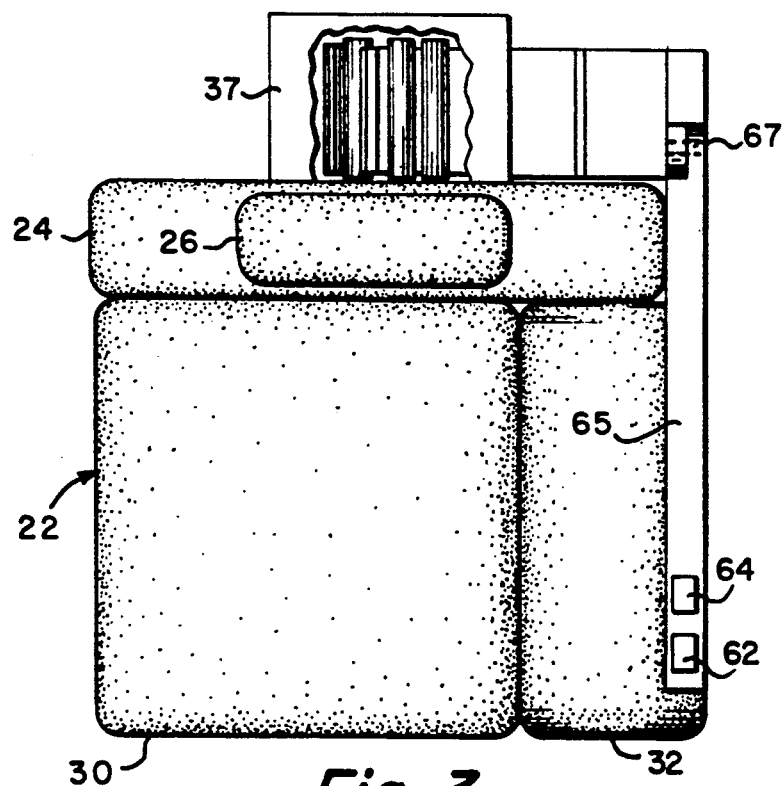
FIG. 3 is a top plan view of the car seat of FIG. 2, partly broken away.
Figure 2:
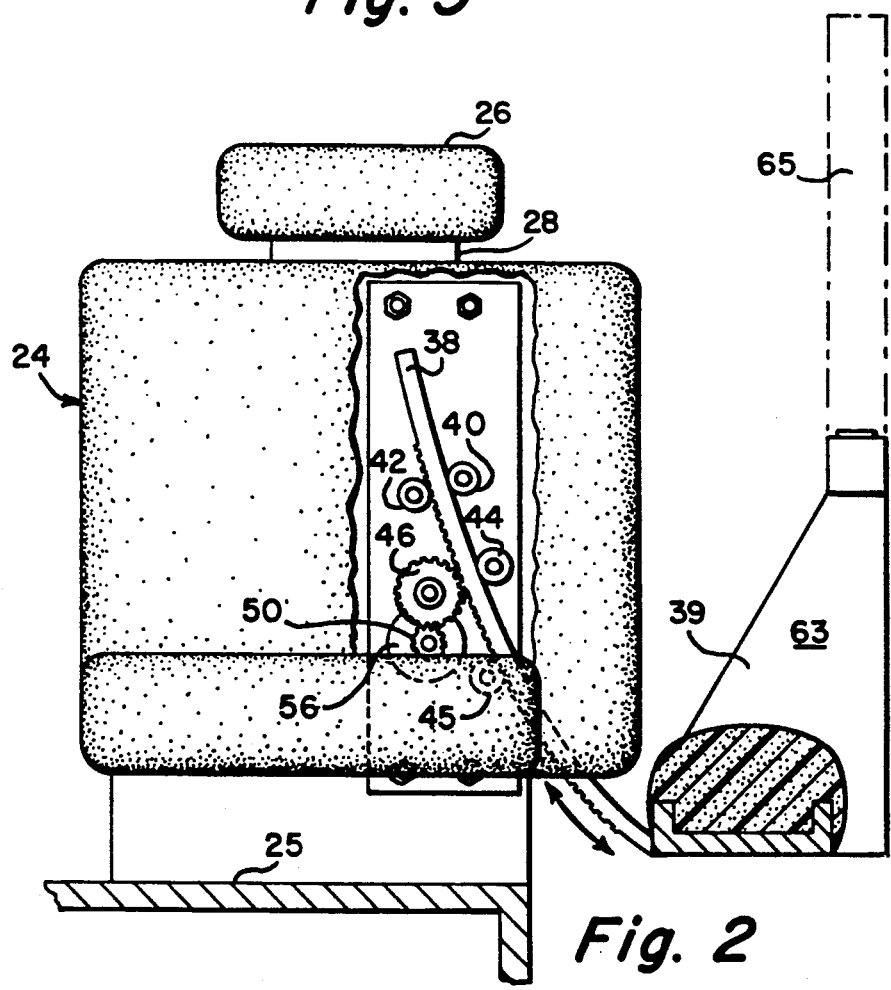
FIG. 2 is a front plan view of the car seat of FIG. 2, partly broken away.

The illustrated embodiment, as shown in FIGS. 1, 2 and 3, is a driver's seat 20 comprising a seat cushion assemblage 22, a back cushion 24 and a head cushion 26. Seat cushion assemblage 22 and back cushion 24 are carried by a frame, the base of which is shown at 25 and the back of which projects upwardly into back cushion 24. Back cushion 24 and head cushion 26 are of conventional appearance. Head cushion 26 is carried at the upper end of a mounting plate 28 which projects into a guide (not shown) at the top of the upright part of the frame within back cushion 24, by which its height is adjustable.

Figure 5:
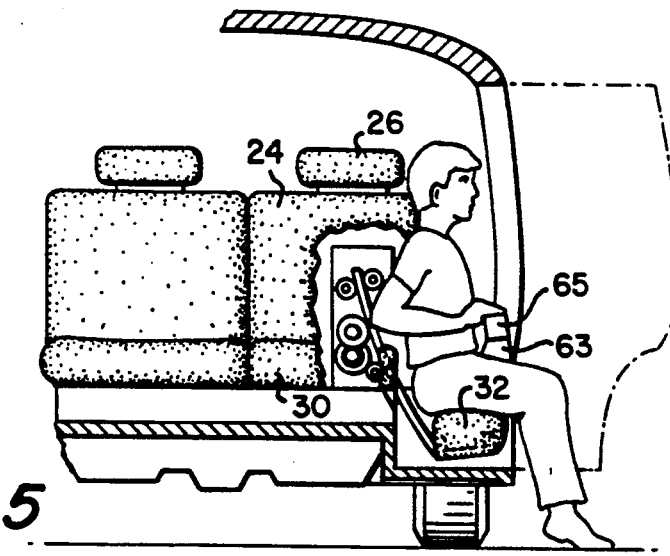
FIG. 5 illustrates the operation of the illustrated embodiment when in extended position.
Figure 6:
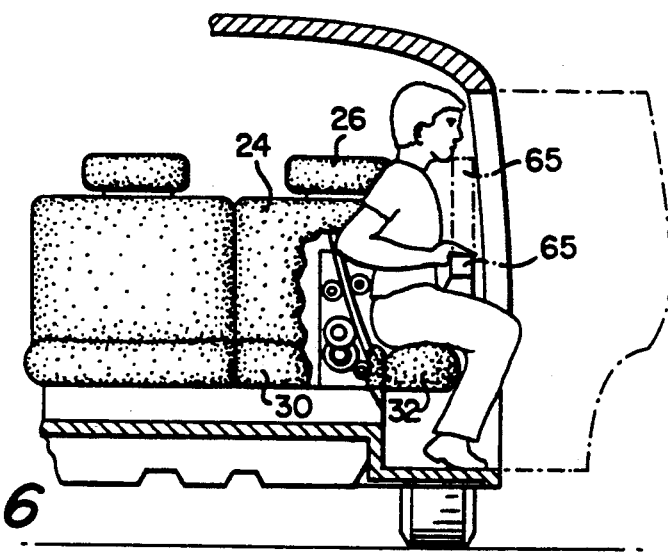
FIG. 6 illustrates the operation of the illustrated embodiment when in retracted position.
Figure 7:
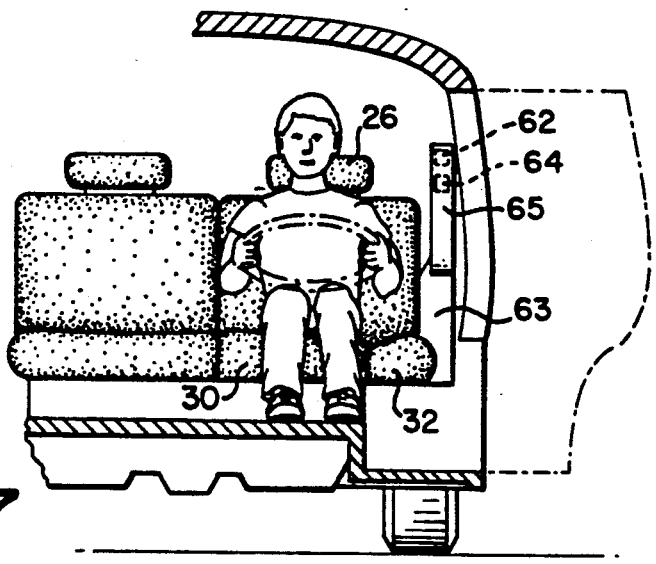
FIG. 7 further illustrates the operation of the illustrated embodiment when in use.

Seat cushion assemblage 22 includes a stationary cushion 30 and a transport of lift cushion 32. Transport cushion 32 is constrained for movement between a retracted position, as shown in FIGS. 3, 6 and 7, and an extended position, as shown in FIGS. 1, 2 and 5. Between these inner and outer extremities, the transport cushion initially moves through a path that generally extends outwardly and downwardly. When transport cushion 32 is retracted, it presents, together with stationary cushion 30, a composite cushion assemblage with contours that comfortably seat both regular and disabled drivers. The profile across the front of the composite cushion assemblage, as seen in FIGS. 6 and 7, is a slight trough, the center of which is somewhat lower than the opposed sides of the stationary cushion and the transport cushion.

As shown in FIGS. 1, 2 and 3, the mechanism for carrying the transport cushion between its retracted and extended positions is contained in a housing 37 at the rear of back cushion 24 and includes a curved slide 38 which is welded to a bracket 39 at its outer extremity. Housing 37 is mounted on frame 25. A horizontal arm 41 extends forwardly from bracket 39 for supporting the transport cushion. Movement of slide 38 is constrained by four rollers 40, 42, 44 and 45. The position of slide 38 in its path is determined by a drive pinion 46 which meshes with a rack 48 that is attached to and along the inner face of slide 38. Drive pinion 46 meshes with a control pinion 50 that is mounted on the shaft of a reversable motor 56 within housing 37. Rollers 40, 42, 44 and 45, motor 56 and gearing 46, 50 are mounted in housing 37. The path of slide 38 is established by rollers 40, 42 which oppose each other, and by rollers 44, 45 which oppose each other. Preferably, when viewed across the front of seat 20, the width of transport cushion 32 is no more than one-half the total width of the composite cushion so that it is free to clear the doorway.

Motor 56 is powered by: the car battery 60; an "up" safety switch 62; a "down" safety switch 64; an interlock switch 61 which immobilizes the circuit when the door is closed; and a pair of limit switches 66, 68 which interrupt power when the transport cushion reaches its most extended or retracted position.

Upwardly extending from the bracket 39 is a vertical arm 63, which pivotally mounts a handle bar 65 on a hinge 67. Handle bar 65 moves between an upright orientation along the side of the seat and a transverse orientation along the length of the transport cushion. When handle bar 65 is upright, a person can move freely to and from the seat. When handle bar is across, a seated person is restrained on the transport cushion.

Switches 62, 64, which are located on handle bar 65, must be controlled continuously by the driver in order to continually energize motor 56. Thus, any lapse in the driver's capacity or attention, as a safety precaution, will interrupt movement of the transport cushion. Switch 64 causes transport cushion 32 to extend. Switch 62 causes transport cushion 32 to retract. FIGS. 5, 6 and 7 depict the successive postures of the driver as he enters a mini-van through an open door.

As shown in FIG. 5, the driver is seated on the transport cushion with his legs extending through the open door. His hands are resting on the handle bar, his right hand being in position to maintain contact with and control of the "up" switch to cause the transport cushion to retract. As the transport cushion moves inwardly, the driver's grip on the handle bar steadies his body as his posture changes. As the transport cushion moves, the driver slides gradually and comfortably about its rounded outer edge. As shown in FIG. 6, retraction of the transport cushion continues as the driver ascends through the open doorway. As shown in FIG. 7 the driver has swung his legs under the steering wheel and is in driving position.

Figure 4:
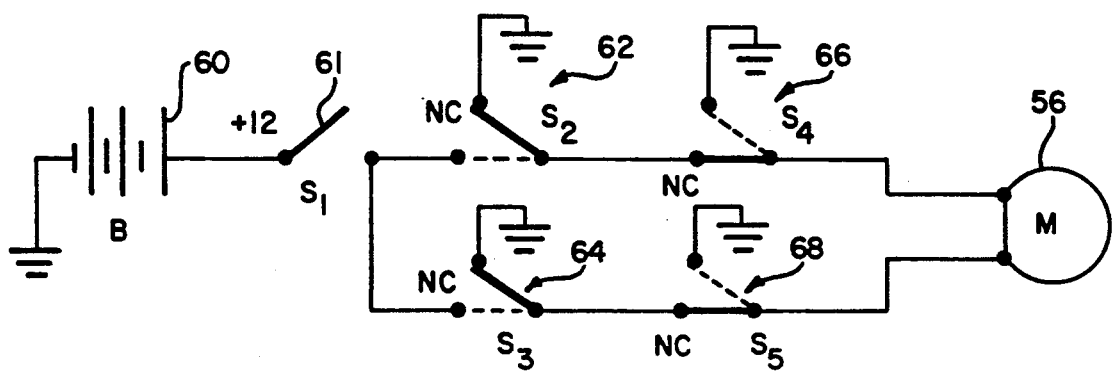
FIG. 4 illustrates the control circuit of the illustrated embodiment.

When exiting the mini-van, the handle bar is upright and the driver sits against the rounded edge of the extended transport cushion. Thereafter the driver pivots the handle bar downwardly and maintains manual contact with and continued control of the "down" switch as he proceeds through a sequence of steps that are opposite to the steps described above in reference to FIGS. 4, 5, and 6. The transport cushion mechanism prevents the door from closing unless the transport cushion is entirely within the car and clear of the doorway. However, the car can be locked completely with the transport least partly extended so as to be ready for a returning disabled driver. Alternatively, the car can be locked with the transport cushion retracted so as to be ready for use by a normal driver or ready to be extended for use by a disabled driver.

OPERATION

In operation, the driver's or passenger's seat of the present invention is adapted for comfortable use by either a normal driver or passenger, or a disabled driver or passenger. When transport cushion 32 is retracted and handle bar 65 is upright, this automotive seat is characterized by the appearance and comfort of an ordinary mini-van seat. However, without any appreciable interference with such normal use, this car seat is adapted for use by a disabled driver or passenger who may steady himself behind the handle bar at an open door as he or she presses the "up" or "down" switch for help in entering or leaving the mini-van.

What is claimed is:

1. A seat only for a single driver or single passenger at the door of an automotive vehicle, said door moving between closed and open positions at a doorway through which said seat is accessible, said seat comprising:
   (a) back cushion means presenting a geometrical contour only for said single driver or single passenger;
   (b) seat cushion means presenting a geometrical contour only for said single driver or single passenger;
   (c) electromechanical means; and
   (d) operational means;
   (e) said seat cushion means including stationary cushion means remote from the doorway and transport cushion means adjacent to the doorway, said stationary cushion means providing the major portion of said geometrical contour of said seat cushion means;
   (f) said transport cushion means being constrained for movement in a path between a retracted position and an extended position;
   (g) said transport cushion means, when in retracted position, presenting, together with said stationary cushion means, a substantially geometrically continuous upper surface having a trough along its front edges;
   (h) said transport cushion means, when moving into extended position, traversing a path from its retracted position;
   (i) said operational means including manual actuating means for maintaining movement between said retracted position and said extended position when under constant manual control;
   (j) said actuating means being accessible to said constant manual control in close proximity to the doorway of said automotive vehicle;
   (k) said path extending downwardly and outwardly from the innermost location of said transport cushion.

2. The seat of claim 1 wherein the outward edge of said transport cushion is rounded.

3. The seat of claim 1 wherein the transverse width, along the front edge of said seat is such that the transverse width of said transport cushion means is no greater than the transverse width of said stationary cushion means.

4. The seat of claim 1 wherein said path extends upwardly and inwardly at the outermost location of said transport cushion.

5. The seat of claim 1 wherein said operational means comprises slide means and guide means for constraining said slide means along said path.

6. The seat of claim 1 wherein a handle bar is constrained for pivotal movement between an upright orientation and a transverse orientation.

7. The seat of claim 6 wherein said manual controls are mounted on said handle bar.

8. A seat only for use by a single person at the door of an automotive vehicle, said door moving between closed and open positions at a doorway through which said seat is accessible, said seat comprising:
   (a) a back cushion presenting a substantially continuous contour for accomodating said single person;
   (b) a seat cushion assemblage presenting a substantially continuous contour for accomodating said single person;
   (c) an electrical control circuit electromechanical means; and
   (d) a mechanical movement;
   (e) said seat cushion assemblage including a stationary cushion remote from the doorway and a transport cushion means adjacent to the doorway;
   (f) said mechanical movement constraining said transport cushion in a path between a retracted position contiguous with said stationary cushion and an extended position removed from said stationary cushion;
   (g) said transport cushion, when in retracted position, presenting, together with said stationary cushion a substantially geometrically continuous upper surface having a trough along its front edge, the major portion of said continuous upper surface being presented by said stationary cushion;
   (h) said transport cushion, when moving into an extended position transversing a path;
   (i) said electrical control circuit including a switch for maintaining movement between said retracted position and said extended position only when under manual contact;
   (j) said switch being accessible in close proximity to the window sill of said door of said automotive vehicle;
   (k) said path extending downwardly and outwardly at the innermost location of said lift cushion.

9. The seat of claim 8 wherein the outward edge of said transport cushion is rounded to permit sliding of a person thereabout.

10. The seat of claim 8 wherein the transverse width, along the front edge of said seat is such that the transverse width of said lift cushion is no greater than one-half of the transverse width of said seat cushion assemblage.

11. The seat of claim 8 wherein said path extends downwardly and outwardly at the outermost location of said lift cushion.

12. The seat of claim 8 wherein said mechanical movement comprises a slide and a guide for constraining said slide along said path.

13. The seat of claim 8 wherein a handle bar is constrained for pivotal movement between an upright orienation at which a person seated on the transport cushion is free to move therefrom and a transverse orientation at which a person seated on the transport cushion is restrained thereon.

14. The seat of claim 1 wherein said manual controls are mounted on a said handle bar.

15. A seat for a driver at the door of a mini-van, said door moving between closed and open positions at a doorway through which said seat is accessible, said seat comprising:
   (a) a back cushion for retaining said driver;
   (b) a seat cushion assemblage for seating said driver, said seat cushion assemblage including a stationary cushion and a lift cushion;
   (c) an electromechanical system for positioning said lift cushion;
   (d) an operational system for controlling said electromechanical system;
   (e) said stationary cushion being remote from the doorway and said lift cushion being adjacent to the doorway;
   (f) said lift cushion being constrained for movement in a path between a retracted position and an extended position;
   (g) said lift cushion, when in retracted position, presenting, together with said stationary cushion, a substantially geometrically continuous upper seating surface;
   (h) said lift cushion, when in extended position, being located outwardly and downwardly of its retracted position;
   (i) said operational system including a manual actuator for maintaining movement between said retracted position and said extended position when under constant manual control;
   (j) said actuator being accessible to said constant manual control in close proximity to the doorway of said automotive vehicle;
   (k) the outward edge of said lift cushion being rounded;
   (l) the transverse width along the front edge of said seat being such that the transverse width of said lift cushion is no greater than one half the transverse width of said stationary cushion;
   (m) said path extending downwardly and outwardly at the innermost position of said left cushion;
   (n) a handle bar movable with said lift cushion between an upright orientation and a transverse orientation;
   (o) said manual controls being mounted on said handle bar.

* * * * *